(12) United States Patent
Lavenson et al.

(10) Patent No.: US 10,501,925 B1
(45) Date of Patent: Dec. 10, 2019

(54) NOTIFICATIONS FOR REDUCING OVERFLOWS FROM COMBINED SEWER SYSTEMS AND SANITARY SEWER SYSTEMS

(71) Applicants: Christopher Conway Lavenson, Louisville, KY (US); Ted Smith, Louisville, KY (US)

(72) Inventors: Christopher Conway Lavenson, Louisville, KY (US); Ted Smith, Louisville, KY (US)

( * ) Notice: Subject to any disclaimer, the term of this patent is extended or adjusted under 35 U.S.C. 154(b) by 178 days.

(21) Appl. No.: 15/072,680

(22) Filed: Mar. 17, 2016

Related U.S. Application Data

(60) Provisional application No. 62/135,952, filed on Mar. 20, 2015, provisional application No. 62/136,901, filed on Mar. 23, 2015.

(51) Int. Cl.
*E03F 1/00* (2006.01)
*C02F 1/00* (2006.01)
(Continued)

(52) U.S. Cl.
CPC ............ *E03F 1/00* (2013.01); *C02F 1/008* (2013.01); *C02F 3/006* (2013.01); *G01F 15/07* (2013.01);
(Continued)

(58) Field of Classification Search
CPC ..... E03F 1/00; E03F 1/001; E03F 3/00; E03F 3/02; E03F 2201/00; E03F 2201/20; C02F 1/008; C02F 3/00; C02F 3/006; C02F 2209/00; C02F 2209/001; C02F 2209/005; C02F 2209/006; C02F 2209/008; C02F 2209/40; C02F 2209/42; C02F 2209/44; G01F 7/00; G01F 15/00; G01F 15/02; G01F 15/07; G01F 15/075; G01F 25/00; G01F 25/0007; G08B 21/00; G08B 21/18; G08B 21/182; G08B 21/20; G08B 23/00;
(Continued)

(56) References Cited

U.S. PATENT DOCUMENTS 5,283,569 A 2/1994 Nelson
5,342,144 A 8/1994 McCarthy
(Continued)

OTHER PUBLICATIONS

Publication by Pendergrass et al, "Two Modes of Change of the Distribution of Rain", Published Nov. 15, 2014 by American Meteorological Society, pp. 8357-8371.*

(Continued)

*Primary Examiner* — Joseph W Drodge
(74) *Attorney, Agent, or Firm* — Ascentage Patent Law, LLC; Travis Lee Johnson

(57) ABSTRACT

Present embodiments include steps and system components for establishing geographic zones determined by population, terrain, terrain composition, water table, and other factors, in terms of the propensity within the zone for generating wastewater and the effect of the generated wastewater on combined sewer system capacity. Such steps and system components include the application of an algorithm for generating and transmitting permissions packets to consumer and industrial users of wastewater-generating appliances and machines, whereby a permission packet notifies such users of the need to discontinue wastewater-generating activities.

7 Claims, 4 Drawing Sheets

(51) Int. Cl.
*C02F 3/00* (2006.01)
*G01F 15/07* (2006.01)
*G01F 25/00* (2006.01)
*G08B 21/18* (2006.01)
*G05D 7/06* (2006.01)
*G01W 1/14* (2006.01)

(52) U.S. Cl.
CPC ........... *G01F 25/0007* (2013.01); *G01W 1/14* (2013.01); *G05D 7/06* (2013.01); *G08B 21/18* (2013.01); *C02F 2209/001* (2013.01); *C02F 2209/005* (2013.01); *C02F 2209/40* (2013.01); *C02F 2209/42* (2013.01); *C02F 2209/44* (2013.01)

(58) Field of Classification Search
CPC .......... G08B 31/00; G06F 19/00; G01W 1/00; G01W 1/10; G01W 1/14; G05D 7/00; G05D 7/06; G05D 7/0617
USPC ............... 210/919–921, 143, 170, 1, 170.07, 210/170.08, 170.1, 532.2, 747.1, 747.2, 210/800; 73/195, 196, 198; 702/2, 3, 45, 702/50, 55; 703/6, 7, 9, 10; 340/601–603, 605; 405/36, 37, 51, 52, 405/80
See application file for complete search history.

(56) References Cited

U.S. PATENT DOCUMENTS

| | | | |
|---|---|---|---|
| 5,942,698 A | 8/1999 | Stevens | |
| 5,974,360 A * | 10/1999 | Otsuka | G01S 13/951 342/26 D |
| 6,701,261 B2 | 3/2004 | Schutzbach | |
| 6,807,494 B2 | 10/2004 | Schutzbach et al. | |
| 6,862,528 B2 | 3/2005 | Scannell | |
| 7,336,190 B2 | 2/2008 | Giordano, Jr. et al. | |
| 7,626,508 B2 | 12/2009 | Kosuge et al. | |
| 7,945,071 B2 | 5/2011 | Harrington | |
| 8,137,544 B1 * | 3/2012 | Graves | C02F 3/1242 210/150 |
| 8,660,703 B2 | 2/2014 | Beraud et al. | |
| 2002/0170350 A1 | 11/2002 | Schutzbach | |
| 2005/0072469 A1 * | 4/2005 | Preul | E03F 5/102 137/247.13 |
| 2005/0139552 A1 * | 6/2005 | Bhan | C10G 29/06 208/115 |
| 2005/0273300 A1 * | 12/2005 | Patwardhan | G06F 17/5009 703/9 |
| 2006/0163173 A1 * | 7/2006 | Suzuki | C02F 1/4672 210/753 |
| 2007/0095729 A1 * | 5/2007 | Oka | E03F 1/00 210/143 |
| 2011/0120561 A1 * | 5/2011 | Quigley | E03F 1/00 137/1 |
| 2011/0303310 A1 * | 12/2011 | Klicpera | B05B 12/008 137/551 |
| 2011/0304475 A1 | 12/2011 | Higgins et al. | |
| 2011/0307106 A1 | 12/2011 | Dutt et al. | |
| 2014/0167969 A1 | 6/2014 | Wedig et al. | |
| 2015/0042479 A1 * | 2/2015 | Muetzel | G08B 21/10 340/601 |
| 2015/0204701 A1 * | 7/2015 | Klicpera | G01M 3/00 137/624.11 |
| 2015/0227142 A1 * | 8/2015 | Hutchings | G05D 9/12 700/282 |
| 2016/0076909 A1 * | 3/2016 | Klicpera | G06Q 50/06 73/198 |

OTHER PUBLICATIONS

EPA Publication EPA 832-B-99-002, Office of Water, Jan. 1999, entitled Combined Sewer Overflows, Guidance for Monitoring and Modeling.*

PWEA Position Statement "Combined Sewer Outflows", Adopted by PWEA on Apr. 10, 2014, (Year: 2014).*

Sunkpho, et al.; Real-time flood monitoring and warning system; Journal article; Mar.-Apr. 2011; pp. 227-235; 33(2); Songklanakarin Journal of Science and Technology; http://www.sjst.psu.ac.th.

Einfalt, et al.; Towards a roadmap for use of radar rainfall data in urban drainage; Journal article; 2004; pp. 186-202; 299; Journal of Hydrology; copyright 2004 Elsevier B.V.; www.elsevier.com/locate/jhydrol.

* cited by examiner

NOTIFICATIONS FOR REDUCING OVERFLOWS FROM COMBINED SEWER SYSTEMS AND SANITARY SEWER SYSTEMS

CROSS REFERENCE TO RELATED U.S. APPLICATIONS

This U.S. nonprovisional utility application claims the benefit of priority to both of U.S. Provisional Application No. 62/135,952, which was filed on Mar. 20, 2015, and to U.S. Provisional Application No. 62/136,901, which was filed on Mar. 23, 2015, the contents of both of which are incorporated herein by reference.

FIELD OF INVENTION

Embodiments described relate to systems and methods for reducing the introduction of wastewater into combined sewer systems and sanitary sewer systems.

BACKGROUND

Combined sewer systems provide a collection network of pipes within a municipal wastewater treatment system for conveying wastewater to water treatment plants. Wastewater is a product of activities of daily living and industrial activities. From a residential perspective, wastewater comes from activities like bathing, toilet flushing, laundering, and dishwashing to name a few. Industrially, wastewater is generating by manufacturing and other business sources that use water in their processes, or in their employees activities of daily living, and such processes causes the water disposed of to be unclean. Conceptually, wastewater is divided into two broad categories: gray water is from the above kinds of activities other than toilets and kitchen sinks. Blackwater is generally thought of as wastewater from toilets and kitchen sinks, although some states limit the definition to sewage (wastewater coming from toilets).

A combined sewer system is a municipal wastewater collection system that conveys wastewater and storm water through a pipe system to a treatment plant. The contents of a combined sewer system are both human-generated (wastewater) and naturally-occurring (storm water). A sanitary sewer system is a municipal wastewater collection system that also conveys limited amounts of infiltrated ground water and storm water to a treatment plant. Sanitary sewer systems may have a separate storm sewer system to collect and convey runoff from rainfall and snowmelt. For brevity, where the present descriptions use the term "combined sewer system," the disclosed embodiments likewise apply to sanitary sewer systems.

Wastewater is introduced to a combined sewer system via pipes connected to buildings and residences. Storm water is introduced to the combined sewer system through drains and other inlets that communicate with the surface of the ground. Treatment of wastewater includes both primary and secondary treatment. Primary treatment involves removing large solids and sludge and may include the use of mechanical screens to trap such matter. Secondary treatment involves pathogen removal and breaking down the biological matter in the treated water.

However, the capacity of combined sewer systems to handle combined wastewater and storm water is limited by the finite volume of the pipes making up these systems. When the combined volume of wastewater and storm water entering a system exceeds that finite capacity, for example during and after periods of heavy precipitation, it produces overflow. Instead of allowing the excess to backup into residences and businesses, most combined sewer systems utilize overflow pipes for discharging untreated wastewater directly to natural waterways (e.g., rivers, streams, lakes, estuaries, and coastal waters) when the combined volume of wastewater and storm water exceeds the capacity of the combined sewer system. Such discharges, or combined sewer overflows, often include a combination of storm water runoff as well as residential, commercial, and industrial wastewater, which introduces human and industrial wastes and pollutants into the environment.

The wastes and pollutants that are introduced carry environmental and health consequences, and are the subject of regulatory efforts. In this country, municipalities have secured permits establishing discharge points for combined sewer overflows at thousands of sites. When the amount of discharge at a site(s) exceeds the volume established by permit, a municipality is subject to fines and consent decrees as a means to encourage better management of the combined sewer system.

The success of attempts to control what enters combined sewer systems has been mixed, and many of the municipalities have had to enter into governmental consent decrees aimed at reducing the effects from combined sewer overflows. Some attempts have involved surface diversion means to reduce or slow the volume of storm water that enters the combined sewer system, examples of which include bioretention cells and soil filtration systems. Others have attempted to regulate the progress of the combined wastewater and storm water within the combined sewer system, to increase the period of time it takes for heavy volumes to reach the treatment plant. However, little attention has been paid to reducing the volume of wastewater entering the combined sewer system in the first place. The volume of wastewater produced is a function of human activity. By encouraging or causing the modification of human activity during periods during and after heavy precipitation, as rain is falling or snow is melting, it is possible to reduce the volume of wastewater entering a combined sewer system during those critical times. With proper notification, responsible users will reduce their usage of appliances and machines that generate wastewater for an appropriate period of time until storm water recedes and the combined sewer system returns to pre-storm carrying volume.

Accordingly, present embodiments result in notifications transmitted to appliances, machines, and other devices. Users will see the notifications on a display, and will be able to make informed choices about their wastewater-generating activities, resulting in reduced volumes of wastewater entering combined sewer systems during times when such systems are most affected by heavy precipitation. Additional features and advantages will be evident from reviewing these descriptions and teachings.

SUMMARY

The notifications provided by the present embodiments are generated by permission packets, which are stored, generated, and transmitted by a controller for receipt by an appliance, machine or device such as a tablet or smartphone. The permission packets provide information, generally in the form of a status message or signal, that is displayed on the appliance, machine or device, such as on a display panel, which in some embodiments is a monitor positioned on or near the device, or an LED screen. The permission packets are pre-established and stored in computer memory, and their use is determined by application of an algorithm. A permission packet according to present embodiments drives notifications that may range along a spectrum from "USE" (as in, "permitted") to "OFF" (as in "turn off" appliances and machines that generate wastewater) and like concepts that involve consumer decisions to run or not run their appliances at certain times. An algorithm according to these embodiments employs multiple weighted factors, as described below, including precipitation, terrain, terrain composition, water table, and other factors associated with a specific geographic zone.

Present embodiments relate to acquiring precipitation data (rain or snowfall) currently happening in a predetermined geographic zone or predicted for the future, combined in some instances with temperature data to determine when melting will occur and at what rate. Sources of such data include radar, weather reports, precipitation and water level gauges. The size of the geographic zone depends on population density, activity, and other factors. Embodiments also relate to defining and applying an algorithm that serves as a basis for the permission packets. A controller executing the algorithm generates a notification according to a permission packet. The use of permission packets by the system fluctuates over time based on the algorithm factors, and the notifications transmitted to appliances, machines and devices vary accordingly along the spectrum already referred to. According to further embodiments, data is gathered concerning the use of appliances and machines before and after notifications. Such data is in a form which can be aggregated and studied to determine macro-trends relating to how human activities affect the combined sewer systems, and how notifications according to the present system and methods affect human activities.

For clarity, when referring to a "combined sewer system," the entire three-word phrase is consistently used, as distinguished from use of the word "system" by itself in referring to a controller and other system components that are configured to execute the algorithm of the present embodiments and perform other operations as disclosed herein.

BRIEF DESCRIPTION OF THE DRAWINGS

The drawings and descriptions herein are to be understood as illustrative of structures, features, processes, and aspects of the present embodiments and do not limit the scope of the embodiments. Accordingly, the scope of the embodiments described and/or claimed herein is not limited to the precise arrangements or scale as shown in the figures.

MULTIPLE EMBODIMENTS AND ALTERNATIVES

Figure 1A:
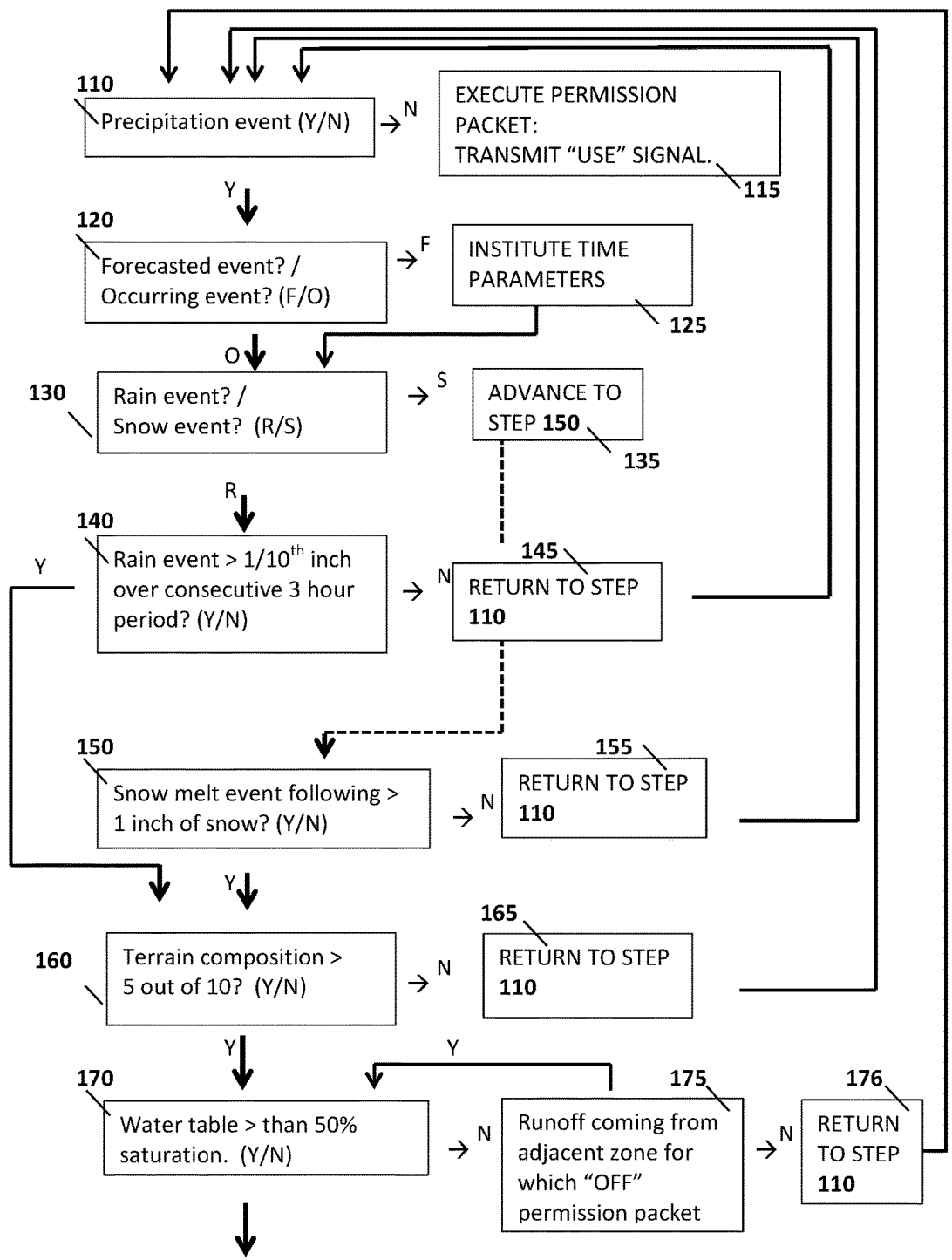
FIG. 1A and FIG. 1B, collectively, are two sheets that form a single complete view that illustrates a notification algorithm for managing human-generated wastewater, according to multiple embodiments and alternatives.

A typical combined sewer system has sufficient capacity to handle any normal volume of wastewater during periods when rainfall is not heavy. In an exemplary system, drains serve as inlets for receiving rainfall and surface runoff (including rain after it passes through building gutters and downspouts). On the other hand, wastewater typically enters through pipes that connect the combined sewer system to residential and industrial sources. In an exemplary combined sewer system, in dry weather wastewater makes up the majority of volume in the combined sewer system, and flows under the force of gravity directly to the treatment plant. But because treatment plants have limited capacity, an exemplary combined sewer system also has an elbow junction or other means of diverting a portion of what is flowing in the pipe so that, when volume is heavy, some is diverted away from the treatment plant under gravity or other forces that control flow in the pipe. For example, a junction might be set up with one pipe leading to the treatment plant, and another leading to an overflow outlet that communicates with waterways. Accordingly, volume of wastewater flowing in the piping must be controlled, and present embodiments do so by providing notifications to upstream users to reduce their wastewater-generating activities.

According to present embodiments, a zone comprises an above-surface, four-point latitude/longitudinal geofence whose area is configurable to vary over time and as storm circumstances change. The area of a given zone depends on precipitation, population, population density, terrain, terrain composition, water table levels, proximity to treatment plant and treatment plant capacity as determined by historical overflow data associated with rainfall amounts. Water table refers to the level below which the ground is saturated with water. In densely populated areas, zones will typically be smaller (all other factors being equal) than in less densely populated areas.

Coordinates for a given zone are also affected by the boundary coordinates for the geofenses associated with nearby zones. If Zone A is adjacent to Zone B on one side, and at lower elevation than Zone B, the system automatically adjusts the coordinates for Zones A and B to account for the fact that Zone A will experience not only its own rainfall, but also the Zone B surface runoff.

Also, coordinate and other data associated with each zone is stored in a data store and dynamically used to re-establish zone boundaries according to changing conditions. Such other data may include the location and number of storm drains providing inlets to the combined sewer system, topography, the area of paved surfaces, and terrain composition. Variables represented by such data inform the selection of zone boundaries. For example, suppose terrain composition in a first zone is primarily sandy, while in a second zone the terrain is clay. In that type of situation, surface runoff will be absorbed more readily by the terrain of the first zone than for the other. Consequently, the more absorbing the terrain, the less runoff enters the storm drain.

Accordingly, based on the information of the data store, the system sets and re-establishes zone boundaries based on static factors (above-surface terrain and below-surface terrain composition are examples) and based on dynamic factors such as time of day, the quantity of appliances and machines (i.e., units) cycling on average for that time, and the average cycle discharge time for the units. A unit location refers to global positioning satellite or similar data providing latitude/longitude coordinates for a particular unit. Stored information about units, their individual and collective cycle discharge time, and their individual and collective discharge volume for a zone can be extrapolated from energy consumption according to statistical models, or based upon population densities in a region and consumer purchasing habits, and the like. Cycle discharge time refers to elapsed time from when the start button on a unit is engaged until it ceases discharging water. Discharge volume refers to an amount of water released by a unit during the cycle discharge time, and it can be estimated through techniques which are known in the art. Alternatively, such information can be obtained for the data store through manual efforts such as sales history, product identification, and product information and specifications. Configuration of the system allows a plurality of zones to be situated on a grid, and the zone boundaries are reconfigurable based on dynamic changes to attributes within the zone.

Various methods are known in the art for forecasting in advance, or collecting actual rainfall and precipitation data over an interval—including the rate of melting of snow—to determine a scaled response to the subject storm in relation to historical information of storms covering a particular zone. Such modeling can be used in connection with the notifications provided for by present embodiments. Storm water volumes entering a combined sewer system, and/or the entering storm water's effects on short term capacity of the combined sewer system, are predicted and modeled for a particular zone. Units within that zone then receive permission packets according to such modeling which are viewable on a display. Alternatively, those who subscribe for such notifications receive the same type of content, for example on a registered device. The scope of novel embodiments according to these disclosures includes the generation and transmission of such permission packets based upon statically stored and dynamically captured information, and transmitting packet notifications for receipt by upstream units, whose generated wastewater is eventually received at a treatment plant, as a means of limiting the amount of wastewater entering a combined sewer system during a time of high volume storm water.

Permission packets are instructions in machine-readable language which are processed by a controller to generate either an on (permission) or OFF signal with respect to units. In some embodiments, permission packets estimate a time until a next cycle should or can begin, and cause a message to be displayed at the unit which contains such information. Alternatively, permission packets issue a pending signal for a user to check back at increments to review a status indicator on the unit, e.g. OFF or USE and to determine whether there has been a change from one signal to another. Accordingly, a status change signal occurs when the system transmits to a unit a signal that is associated with a permission packet which causes the unit to display a message different from what was previously displayed. Where the transmitted signal causes the message, i.e., status indicator, to change from USE to OFF, or vice versa, would be an example of a status change signal. For the case where a status indicator changes from OFF to USE, by way of non-limiting example, this type of transmission produces a message consistent with resume operating the unit. In some embodiments, user response is voluntary with respect to permission packets (especially those sending an OFF signal). In some embodiments, a user has the option to simply ignore the signal, or to initiate at the unit an override sequence that negates the signal initiated by the permission packet.

Figure 1B:
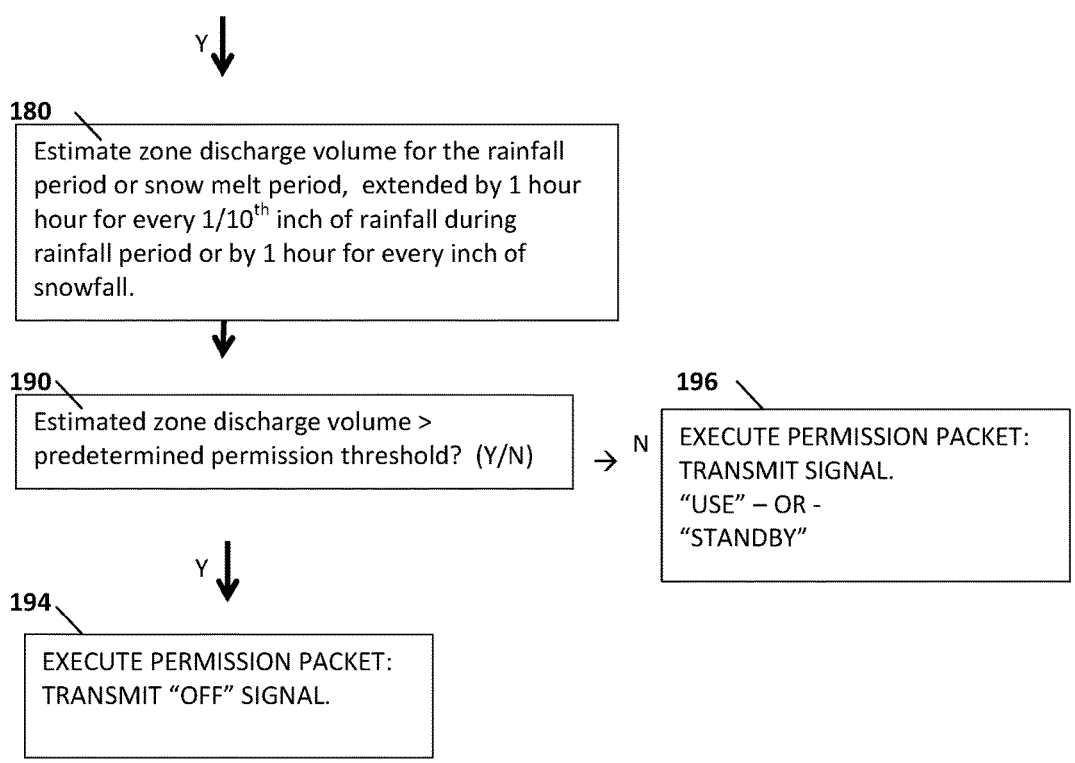

FIG. 1A and FIG. 1B are placed on separate pages due to spacing considerations, but together form one figure representing an algorithm within the scope of present embodiments. Hereafter, these are referred to collectively as FIG. 1. First and foremost, an algorithm according to present embodiments keys off of precipitation events, which could be either rain or snow. If there is no occurrence of precipitation presently or in the immediate forecast, there is limited concern for combined sewer system overflow. Precipitation includes rain and snow. Because it requires time to melt, the impact of snow on a combined sewer system is not as immediate as that of rain, but still must be accounted for in areas where snow fall occurs regularly during parts of the year.

All numbered steps in FIG. 1 are binary in the sense of having two possibilities. Step 110 is a yes/no about whether a precipitation event has occurred or is forecasted to occur. If there is no precipitation event, the controller at step 115 executes a permission packet for the transmission of a signal consistent with "USE" as described elsewhere herein. If step 110 is YES, step 120 differentiates between a forecasted event (F) or an occurring event (0). For a forecasted precipitation event, step 120 includes time parameters as discussed below. Generally, however, aside from timing differences between a precipitation event occurring in real time versus one that is forecasted, the steps of the algorithm are largely the same in terms of steps following step 120.

Step 130 differentiates between a rain event (R) and a snow event (S), one difference of which is timing for when the impact will occur on the combined sewer system. In some embodiments, according to step 135, if the precipitation event is snow, the algorithm advances to step 150. Steps 140, 150, and 160 are similar in that each is binary (Yes/No), and if conditions are "NO" the algorithm returns to step 110 until a new precipitation event occurs, or until there is a significant change in an occurring or forecasted precipitation. (Steps 145, 155, and 165, respectively.) Also, steps 140 and 150 are similar in that both use precipitation data. In some embodiments, the algorithm is programmed to resume itself at timed intervals, step 110, which can be set as desired by a system manager to occur at a desired frequency (e.g., every hour, or every 30 minutes). Alternatively, the controller that executes the algorithm is configured to run the algorithm at different intervals according to the needs of a system manager based upon receipt of a command. System manager refers to a person operating the system or method according to present embodiments, as opposed to the term "user" which refers to someone who owns and operates a unit that generates wastewater. Values which appear in the boxes for steps 140, 150, 160, 170, and 180 of FIG. 1 are stated as examples of an algorithm according to multiple embodiments provided herein. Embodiments are not limited to the values stated in the figure. It is intended that all such values are selectable and will vary as the system manager determines when configuring the system.

Figure 2:
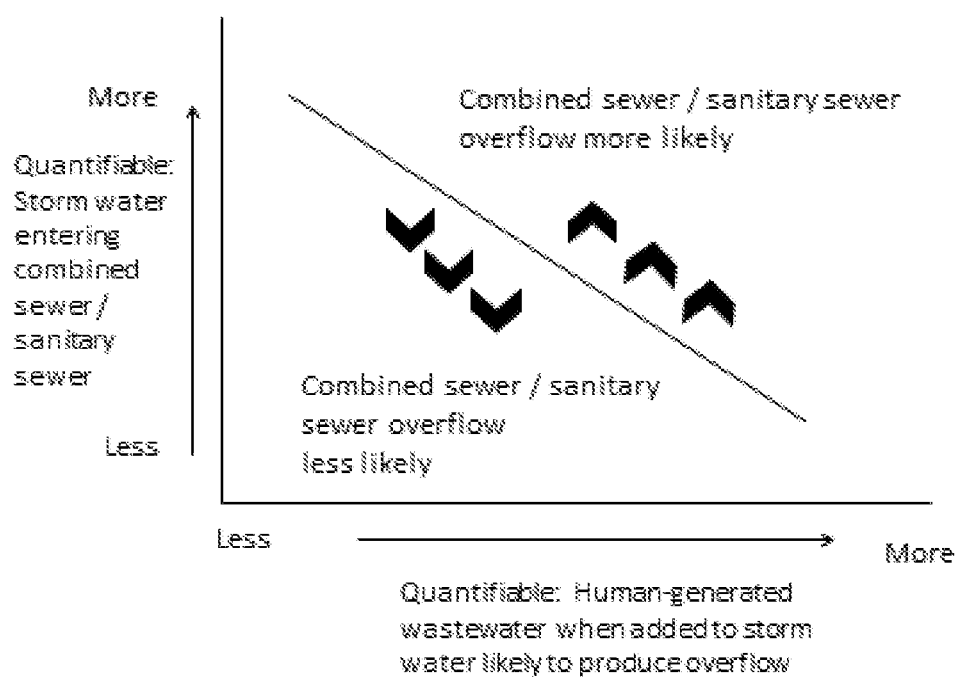
FIG. 2 graphically shows the relationships between (i) more storm water or less storm water entering a combined sewer system, versus (ii) more wastewater or less wastewater entering a combined sewer system, and (iii) how these interrelated factors dictate probability of combined sewer overflow.

FIG. 2 illustrates the relationships between fluctuable quantity of storm water entering a combined sewer system and fluctuable quantity of human-generated wastewater, and how these relationships can produce overflow. Keeping wastewater at the "Less" end of the horizontal is an important factor during times of heavy rainfall or snowmelt producing natural storm water entering a combined sewer system.

With further reference to FIG. 1, steps 140 (rain) and 150 (snow) both provide a particular over (i.e. "YES")/under (i.e., "NO") proposition for a measured or forecasted quantity of precipitation. For some zones, an appropriate threshold at step 140 is $1/10^{th}$ of an inch of rain occurring over three consecutive hours. This particular value will likely vary from one zone to another, and can be programmed as selected by the system manager. Also, this value can be set and changed as desired by the system manager in view of static or dynamic factors, including the known capacity of any proximate combined sewer system that will be affected by wastewater generation in a particular zone. In some embodiments, the controller is sensitive to one or more static or dynamic factors to recalculate the numerical value for inches of rain in a period.

FIG. 1 illustrates an exemplary algorithm according to multiple embodiments and alternatives within the scope of the present disclosures. It will be appreciated that additional steps may be added to FIG. 1, or certain steps listed in FIG. 1 may be omitted. For example, depending on the situation, the implementation of permission packets, according to a notification algorithm for an occurring rain event according to steps 110 and 140, results in the execution of a permission packet according to step 194.

In some embodiments, at step 150 an algorithm according to present embodiments receives input of, or recalculates, a value in similar fashion with respect to measurable or forecasted snowfall, with the ability to change as discussed above for step 140. In FIG. 1A, the value of 1 inch of snowfall is provided, based on a possible correlation between 0.1 inch of rain to 1 inch of snow, but again this is only by way of example.

Likewise, step 160 differentiates between different types of terrain composition. By way of non-limiting example, persons with knowledge about geology appreciate how the sub-terrain affects the ground's ability to absorb water, the opposite of which is associated with runoff which eventually reaches storm drains and enters a combined sewer system. Terrain can thus be weighted, that is categorized along a spectrum, from "sandy" (assigned value "1") to substantially paved and impermeable to water, such as paved surfaces (assigned value "10"). In some embodiments, a loamy terrain receives an assigned value of "3," while a highly cohesive clay terrain receives an assigned value of "8," while, coming closer to the mid-range along such a spectrum, a terrain marked by loose dirt receives an assigned value of "5." In some embodiments, composite data of all terrains found within a particular zone are considered across an entire spectrum, and factored by their surface area relative to the entire zone to determine a weighted average. Accordingly, a numerical value selected for step 170 will reflect an extent to which water is likely to runoff the surface toward storm drains and be introduced into combined sewer systems. Optionally, the controller is configured, for example, such that when a weighted average value for a zone is below 5, the algorithm returns to step 110 until a new precipitation event occurs, or until there is a significant change in an occurring or forecasted precipitation.

Step 120, previously referenced, and step 125 involve timing differences between a precipitation event presently occurring as opposed to one that is forecasted. In some embodiments, the controller is configured to monitor radar data or other available weather predicting systems to receive forecasted information, and the algorithm is configured to responsively institute time parameters at step 125 based on the timing of the forecasted event. Aside from the different timing parameters which the controller is configured to implement, for a forecasted precipitation event the execution of steps 130 and following will be similar to an actual precipitation event—only with the execution of a permission packet happening earlier or later. An example of timing parameters is a situation where it becomes necessary or desirable to institute permission packets before actual precipitation occurs. One such example revolves around peak usage of units in a municipality, which is generally between about 4 PM to 7 PM. If a 3:00 forecast is for heavy rain starting at 5:00, in some embodiments a time parameter is implemented as part of the algorithm, resulting (absent a change to the forecast) in executing permission packets consistent with OFF or STANDBY notifications at 4:00 based on the forecasted rain, which is later than the execution of the algorithm by one hour, but also earlier than the forecasted rain event by one hour.

As with steps 140, 150, and 160, step 170 also includes a binary condition used above ("YES") or below ("NO") in view of a predetermined value for the water table within a zone. Like those other steps, a YES situation moves the controller a step closer to instituting permission packets in the execution of an algorithm according to some embodiments. A difference with step 170 is seen in that a NO situation does not return the algorithm immediately to step 110, but instead makes another binary inquiry at step 175 concerning the effects of runoff from adjoining zones. Only if a NO situation exists with respect to level of saturation in the water table for a particular zone and runoff into that zone from adjoining zones does the algorithm return to step 110 as illustrated for step 176 of the algorithm. The water table saturation (step 170) and neighboring zone runoff (step 175) factors are dynamic and capable of changing over relatively short periods of time. Further, when there is a neighboring zone runoff, it may require adjustment of the water table level of saturation. Accordingly, a controller utilized by these embodiments is configured to dynamically recalculate any of the assigned values at steps 140, 150, 170, and to do the same for neighboring zones to the extent such is needed to inform step 175.

Figure 3:
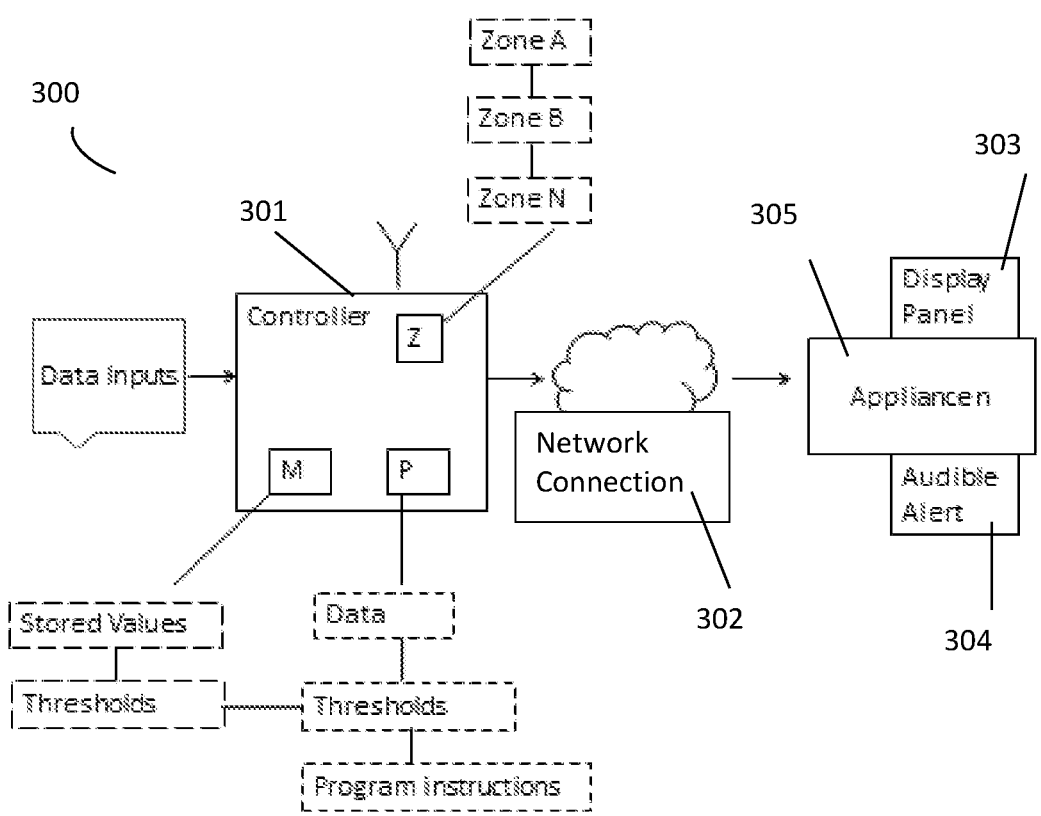
FIG. 3 is a schematic representation of a notification system for managing human-generated wastewater, according to multiple embodiments and alternatives.

FIG. 3 is a schematic representation of an algorithm-based notification system 300 for managing human-generated wastewater. A controller executes machine-readable program instructions supplying algorithmic consideration of the steps in FIG. 1. FIG. 3 additionally shows the controller having memory (M). Stored values of past precipitation events are stored in memory as part of a database (not shown) according to known methods. In some embodiments, the database is configured to receive data inputs and retrievably store data regarding signals transmitted to units (denoted in FIG. 3 as "Appliance n" 305). In some embodiments, the retrievably stored data values track unit operation, discharge cycles and the like. Data concerning unit operation includes whether and how a unit was being operated (e.g., whether OFF or in USE) associated with the permission packet in effect at the time of operation. Thresholds are established as the system manager decides according to present or expected conditions and needs, or are automatically reconfigured during changing conditions by the execution of the algorithm. The processor (P) makes comparisons to weather data stored values and thresholds by applying machine-readable program instructions (software, or object code) installed upon the processor.

The controller is further configured to dynamically determine boundaries for zones (Z), e.g., Zone A, Zone B, and Zone "n." As desired, a controller is equipped with various components for execution of programming, such as microprocessors, single-core processors, multi-core processors, graphics processing units, and various kinds of other processing units known in the art, and capable of executing machine-readable program instructions. As desired, the controller functions are achieved through one of a variety of optional components that provide programmable logic, such as a complex programmable logic device (CPLD) and a field programmable gate array (FPGA) as non-limiting examples. Zones are interdependent upon each other, the boundaries of which may fluctuate based upon current or forecasted events, statically stored information such as the number of units, or occurrences in neighboring zones. Data in the form of unit information or weather forecasts can be input manually, or pushed to the controller. The controller communicates to units, or other devices (e.g., tablet, smart phone, and PC to name a few), over a public or private network. Notification information according to permission packets is displayed visually on the display panel, or provided audibly, or through other means such tactile stimulation or as a report sent to a device which a person can read.

Memory may optionally include read-only memory (ROM), random access memory (RAM), non-volatile RAM (NVRAM), optical media, magnetic media, semiconductor memory devices, flash memory devices, mass data storage device (e.g., a hard drive, CD-ROM and/or DVD units) and/or other storage as is known in the art. Embodiments are not limited by the storage modality. Likewise, a processor according to present embodiments includes, has installed within, or is otherwise communicatively coupled to, memory having computer readable and executable program instructions, rules, and/or routines (any set of which may be referred to herein generally as "Instructions") which, when executed by processor, cause it to perform the steps as described herein according to the disclosed algorithm and notifications. In some embodiments, a processor is coupled to complementary components, for example user interface screens, key pads, light indicators, and/or monitors (these are not shown) responsive to operator input to allow the system manager to make adjustments to the algorithm or otherwise affect the operation of the controller.

If the execution of the algorithm leads straight downward from steps 110 through 170 (i.e., not returned to step 110 at any of those points, including step 176), then at step 180 an estimated zone discharge volume is considered for every unit on record for a particular zone. In terms of arrangement of views in FIGS. 1A and 1B, the two sheets together form, in effect, a single complete view, and are provided so that the sheets can be assembled without concealing any part of any of the views on these sheets. Moreover, by way of orientation, step 170 at the bottom of the sheet that has FIG. 1A leads directly to step 180 that appears at the top of the sheet that has FIG. 1B.

Step 180 includes a temporal component because the effects of precipitation on a combined sewer system continue to occur after the event concludes. This estimated value is then compared to a predetermined permission threshold at step 190. The algorithm concludes at either step 194 or 196 depending on the binary result of step 190. If estimated discharge volume for a zone exceeds that predetermined threshold (e.g., gallons/minute reflecting the capacity of the combined sewer system proximal to a particular zone), the controller initiates a permission packet. An OFF notification signal at step 194 could be consistent with alerting users that responsible use requires turning off units. Other notifications can be worded as the system manager desires, for example "use moderation." Present embodiments are not limited by the choice of verbiage or language for the notifications transmitted. Conversely, if the predetermined threshold is not exceeded, the controller initiates a different permission packet at step 196, consistent with USE, or perhaps continue to monitor the situation as in STANDBY (e.g., to determine if the precipitation event clears before peak usage times arrive).

In some embodiments, transmission of notification signals is by indicator light on a user interface, where green is a symbol for USE, yellow for STANDBY, and red for OFF. Notification signals may also be transmitted through other mediums and with other symbolic information according to how the system manager desires. Textual word notifications and warning symbols are within the scope of present embodiments. As desired, signals are transmitted to the units themselves, which are equipped with visual display or audible interfaces, or transmitted to separate devices that a user might subscribe to in order to receive the notifications. Subscription setup and registration means are within the scope of present embodiments and can be practiced by system managers according to known methods. Whether notifications are sent to discrete units or a separate device under a registered subscription, transmission and receipt of all signals described herein occur over public or private networks, as selected. Network connectivity is accomplished according to known wired or wireless methods, and may involve a local area or other suitable network configuration. The scope of present embodiments is not limited by the kinds, number, and type of controller or other hardware selected.

For purposes of establishing zone boundaries as well as values discussed within various boxes shown for the steps of FIG. 1, static factors include number of units in a zone, discharge volume for the collective units, and terrain compositions. While some static factors may change over time, these are not likely to change significantly during the occurrence of a precipitation event. Dynamic factors, on the other hand, are generally associated with parameters shown at steps 140, 150, 170, 175, 180, and 190. These include the magnitude of rain and snow events as they occur or are forecast to occur, the condition of the water table, and runoff potential or occurrence from neighboring zones. Accordingly, changes to individual or multiple of these dynamic factors prompts the controller to adjust algorithm parameters at other of these steps (e.g., increase in the water table may reduce the threshold used to compare against the estimated zone discharge volume at step 180).

Likewise, the controller is configured in some embodiments to utilize changes in the dynamic factors to drive changes to boundary locations among zones within a particular municipality. A cloudburst affecting a small area is likely to require the size of zones to be reduced so as not to initiate unnecessary permission packets within residences of a zone that is not seeing precipitation or effects of runoff. Similarly, dynamic changes to zone boundaries may be appropriate in view of precipitation events occurring in adjoining zones and producing runoff. Such changes can be made in real time based on conditions as they happen. Alternatively, zone boundaries are changed based upon static conditions like the number of units in a zone and their collective discharge volumes.

Zone boundary changes involve the movement of zone boundaries that determine the geofences which system 300 establishes around particular zones. Accordingly, such boundaries fluctuate over time because of static factors such as the number of units or the type of discharge of those units in a zone. But such boundaries also fluctuate due to dynamic factors that change during an actual precipitation event. A non-limiting example of such a zone boundary change would involve heavy rainfall for an extended period (e.g., >12 hours) in an area that causes a first zone (i.e., Zone A in this example) to enlarge into part or all of at least one neighboring zone (i.e., Zone B), causing the neighboring zone to shrink. In such a case, depending on the size of the rain cell, the amount and duration of the rainfall, and topography, among other FIG. 1 factors, the controller of system 300 is configured to enlarge Zone A and shrink Zone B by a similar amount, up to and including Zone B becoming subsumed within Zone A.

In the present example, suppose rainfall persists for a 24-hour period over Zone A. In some embodiments, the controller of system 300 is configured to adjust the respective boundaries of Zones A and B, resulting in the inclusion of a portion of the neighboring Zone B within Zone A due to runoff from original Zone A entering upon Zone B. The controller maintains the modified boundaries of these zones for a period of time after rainfall ends. Such period of time may be determined in accordance with step 180 with respect to the estimated discharge volume for the adjusted zones. After the period of time elapses, the controller reverts the zone boundaries to their original placement. Zone boundaries may change for longer periods based on differences between the zones as may be related to topography or other factors. An example would be Zone A (according to pre-adjusted boundaries) having two times or more surface area that is grassy compared to Zone B, the latter having a predominance of surface asphalt and concrete.

In some embodiments, system 300 includes a module by which the controller 301 queries units over a network with respect to operation of the units, and controller receives and stores such operational data. In some embodiments, the controller of system 300 is further connected over a network to an independent server which aggregates and stores notification information sent to units, and histories of unit use and modification of use in response to notification. Optionally, such storage occurs within the database of the controller of system 300. The information based on unit response is retrievably stored as part of a data warehouse, which can be either aggregated or by individual unit as desired, and is thus available for study according to various purposes. Such purposes include but are not limited to determining the effectiveness of a program for purposes of managing human-generated wastewater during high volume precipitation.

It is to be understood that the embodiments described and/or claimed herein are not limited in their application to the details of the teachings and descriptions set forth herein, or as illustrated in the following examples. Rather, it will be understood that the embodiments are capable of being practiced or carried out in multiple ways, according to many alternatives based on these descriptions and teachings.

Further, it will be understood that the phraseology and terminology used herein is for the purpose of description and should not be regarded as limiting. The use herein of "including," "comprising," "e.g.," "such as," "containing," or "having" and variations of those words is meant in a non-limiting way to encompass the items listed thereafter, and equivalents of those, as well as additional items. Accordingly, the foregoing descriptions are meant to illustrate a number of embodiments and alternatives, rather than limiting to the precise forms and processes disclosed herein. The descriptions herein are not intended to be exhaustive. It will be understood by those having ordinary skill in the art that modifications and variations of these embodiments are reasonably possible in light of the above teachings and descriptions.

What is claimed is:

1. A method for reducing wastewater content in a combined sewer system, comprising:
   obtaining and storing precipitation data in computer memory for a specified geographic zone including obtaining data from radar and water level gauges;
   estimating wastewater generating unit discharge volume and discharge times, both individually and collectively for the specified zone based on energy consumption and population density information for the specified zone using a controller having a processor;
   determining anticipated effects caused by precipitation in the specified zone based on an amount of anticipated precipitation and the estimated discharge volume and time information for wastewater generating units associated with the specified zone using the controller;
   establishing at least one reconfigurable threshold using the controller based on the determination for the specified zone and comparing stored precipitation data to said at least one threshold, wherein the at least one reconfigurable threshold is reconfigured automatically as actual precipitation amounts change;
   transmitting signals from the controller to appliances and other wastewater generating units in the specified zone, for modifying the discharge cycles and the "on-and-off" status times for the appliances and other wastewater generating units in the at specified zone, so as to minimize fluctuations of total water flow in the combined sewer system; and
   receiving by the controller a status indicator concerning operation of the appliances and other wastewater generating units both before and after transmission of said signals.

2. The method of claim 1, wherein the at least one reconfigurable threshold is further determined by factors chosen from the group consisting of quantity of precipitation, duration of precipitation, condition of water table, and terrain composition.

3. The method of claim 1, wherein the precipitation data contains an amount of rainfall or snowfall.

4. The method of claim 3, wherein the precipitation data is a forecast amount of rainfall or snowfall.

5. The method of claim 1, further comprising storing a record of transmitting signals for modifying the discharge cycles and the "on-and-off" status times for the appliances and other wastewater generating units in the specified zone.

6. The method of claim 5, further comprising retrieving a stored record of the signals transmitted for modifying the discharge cycles and the "on-and-off" status times for the appliances and other wastewater generating units in the specified zone.

7. The method of claim 5, further comprising estimating a time duration before a resume operating transmission signal is to be sent.

* * * * *